July 1, 1958   C. L. ALDRIDGE ET AL   2,841,618
ALDEHYDE PURIFICATION
Filed Nov. 9, 1956
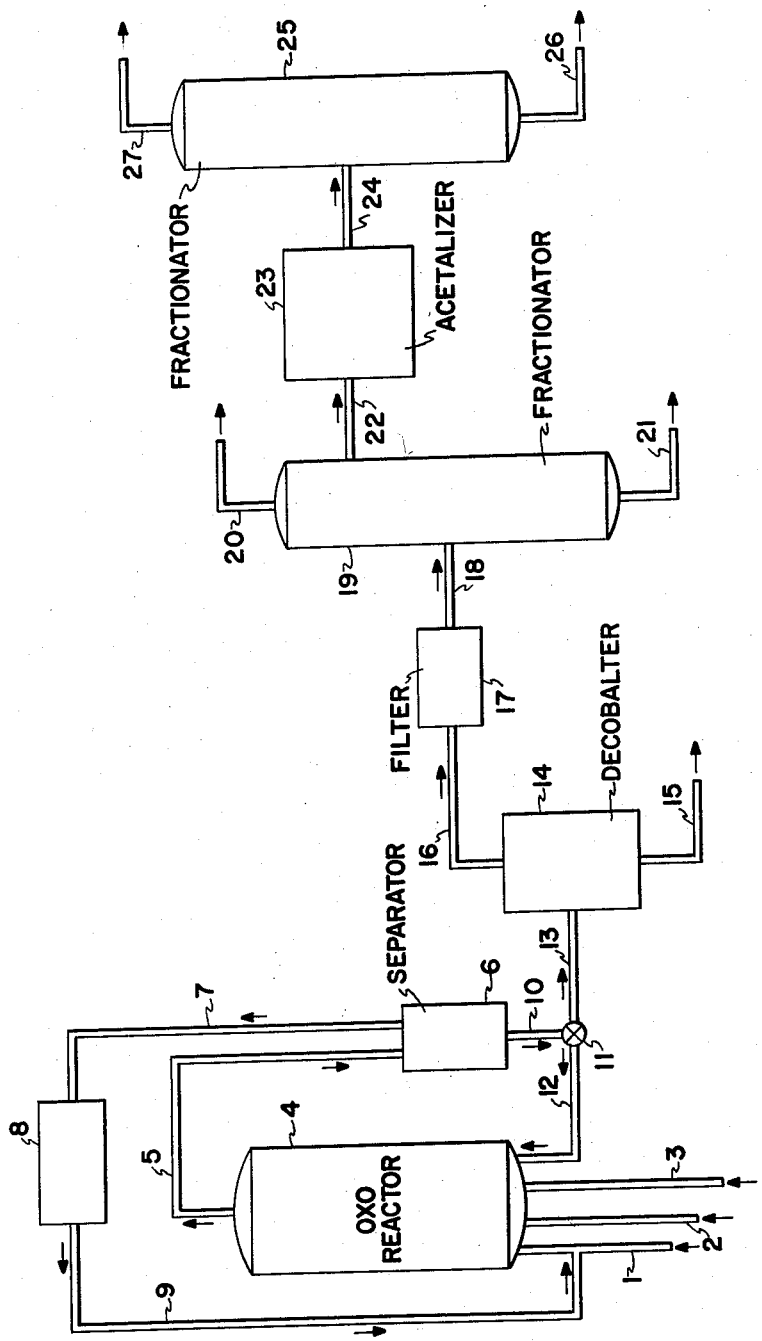
Clyde Lee Aldridge
Rhea N. Watts
Inventors
By Henry Berk   Attorney United States Patent Office 2,841,618
Patented July 1, 1958

2,841,618

ALDEHYDE PURIFICATION

Clyde Lee Aldridge, Baker, and Rhea N. Watts, St. Francisville, La., assignors to Esso Research and Engineering Company, a corporation of Delaware Application November 9, 1956, Serial No. 621,364

17 Claims. (Cl. 260—604)

This invention relates to a process of purifying aldehydes derived from the carbonylation of olefins with carbon monoxide and hydrogen in the presence of a carbonylation catalyst. More specifically this invention relates to the removal from oxo aldehydes, alcohols which cannot be separated by distillation.

The oxo or carbonylation process as practiced today comprises generally the reaction of an olefinic compound or mixtures thereof with carbon monoxide and hydrogen, at elevated temperatures and pressures in the presence of a cobalt or other group VIII metal containing catalyst to form the crude aldehyde product. For most purposes with exception of recycling aldehyde product to the reaction zone, the cobalt or other metal is then removed. The crude aldehyde product besides containing the catalyst contaminant also contains unreacted olefin, hydrocarbon diluent, acetals, alcohols and the like, some of which boil in the same range as the product aldehyde, some such as the olefins boiling at lower temperatures and some such as the so-called dimer aldehydes and alcohols boiling at much higher temperatures. The removal of the olefins, other low boiling components and the high boiling components may be accomplished easily by any of various techniques of distillation. However, in the oxo aldehyde product there are usually alcohol contaminants which boil in or near the same boiling range as the desired aldehyde product and it is these alcohol contaminants which cannot be removed by ordinary means such as distillation either at atmospheric conditions, under reduced pressure conditions or with steam.

It is a principal object of this invention to effect the substantially complete removal of aldehyde product contaminants and especially those alcohol contaminants which cannot be removed by distillation.

To demonstrate the type as well as source of these close boiling alcohol contaminants a typical $C_9$ olefin oxo feed stock obtained by the polymerization of propylene was analyzed and it was found to contain 96% $C_9$ olefins, 2% $C_8$ olefins and 2% $C_{10}$ olefins. This fraction is usually referred to in the art as a U. O. P. $C_9$ olefin cut. This oxo feed stock was oxonated at 350° F. at 3000 p. s. i. g.; $H_2/CO=1.1/1$ at a space velocity of 0.5 v./v./hr. in the presence of 0.1–0.2% cobalt oleate expressed as cobalt with an 80–90% conversion. The crude aldehyde product was decobalted at 300° F., 10% $H_2O$ at approximately 1 v./v./hr. with a hydrogen total pressure of 165 p. s. i. g.

An attempt was then made to purify the aldehyde product by distillation. The first distillation was carried out at 100 mm. Hg and a 5/1 reflux ratio in a 30 plate Oldershaw column yielding 19% aldehyde product having a purity of 91% based on carbonyl number.

A second distillation was carried out under similar conditions with a reflux ratio of 10/1. In this distillation the yield was 24% of aldehyde with a purity also of 91%.

The following analysis was obtained on a sample of $C_{10}$ aldehyde prepared by this distillation procedure:

| | Percent |
|---|---|
| Carbonyl No. 328 (theoretical 360) | 91.2 |
| Hydroxyl No. 34.6 (theoretical 355) | 9.7 |

These data clearly indicate that the contaminants are largely alcohols which cannot be removed by distillation.

Although the above example is concerned with $C_9$ olefin oxo feeds and the $C_{10}$ aldehydes derived therefrom it is to be understood that other oxo aldehyde products especially those prepared by oxonating U. O. P. olefins are subject to similar contamination. For example, $C_7$ olefins derived by copolymerizing a propylene-butylene mixture will yield aldehydes containing close boiling alcohol contaminants. The same is true in general for most $C_7$ to $C_{20}$ olefin oxo feed stocks, and the problem is most acute in the $C_{9+}$ olefin feed range.

To effectively free the aldehyde product of the aforementioned close boiling alcohols the present invention contemplates after decobalting the crude aldehyde, carefully fractionating the mixture under controlled mild conditions to remove the light ends comprising unreacted olefins, any hydrocarbon diluent and heavy bottoms comprising dimer products, etc., without causing any substantial degree of acetalization. The aldehyde product after fractionation is then treated in a manner to promote acetalization and the alcohol free aldehyde separated from the newly formed higher boiling acetals.

For a clearer understanding of this invention reference is now had to the attached drawing wherein is shown diagrammatically the improved aldehyde purification process.

Synthesis gas comprising hydrogen and carbon monoxide, the olefin feed, and catalyst, either per se or in any conventional oxo feed organic solvent such as heptane, are fed into the oxo reactor 4 via lines 1, 2 and 3. Synthesis gas may comprise hydrogen to carbon monoxide in ratios of .5–3/1 or higher. As the olefin practically any olefinic hydrocarbon containing from 2 to 20 carbon atoms may be employed. This invention is concerned however with those olefin feeds which upon oxonation yield aldehyde products contaminated with alcohols which cannot be separated by normal distillation per se. Any of the known oxo catalysts may be used and these are represented by cobalt oleate, cobalt naphthenate, cobalt stearate, cobalt formate, cobalt oxalate, cobalt acetate and other organic or inorganic cobalt salts. The oil soluble cobalt salts are preferred since they are easily introduced in solution with either the olefin feed or hydrocarbon diluent, e. g. hexane, heptane and the like. However, water soluble cobalt compounds are also known to be effective in this reaction. Other group VIII metals and compounds are also known to promote the carbonylation synthesis reaction.

Preferably the conditions within the oxo reactor 4 are maintained to inhibit to a great extent the formation of acetal, since any acetal formation in the oxo reactor or in any stage prior to the acetalization step would result in aldehyde product loss of a serious nature. The preferred conditions, therefore, are 150° to 400° F.; 500 to 5000 p. s. i. g.; catalyst concentration, 0.1 to 0.5; synthesis gas rate, 2000 to 5000 s. c. f./bbl.; residence time, 0.5 to 5.0 hr.; and if desired, 5 to 10% water on feed.

After the desired residence time within reactor 4 and after approximately 70 to 100% conversion the effluent is recovered via line 5 and led to high pressure separator 6 wherein unreacted gases are withdrawn overhead via line 7. These gases may then be fed into scrubber 8 wherein the gases are freed of entrained liquid and cobalt carbonyl. The effluent from scrubber 8 may be used in any way desired; however, in a commercial operation it is usually economical to recycle said effluent gases such as via line 9 to the reactor.

Aldehyde product containing substantial amounts of contaminants boiling in the range of as well as higher and lower than the desired aldehyde product is then withdrawn via line 10. A portion of this aldehyde product from the high pressure separator may be routed via valve 11 through line 12 as diluent and coolant for the exothermic carbonylation synthesis reaction. The bulk of the contaminated aldehyde product is fed however via line 14 to decobalter 14. Although there are many means of decobalting recited in the voluminous art pertaining to the oxo synthesis, for the purposes of this invention the decobalting operations should be carried out under conditions which are not conducive to acetalization. For example, the absence of water, especially when acids are present, and high temperatures for sustained periods of time are all conducive to the formation of acetal. Thus while means are known for decobalting oxo aldehydes with little or no water it is preferred for the present purposes to employ those means which require water. The use of acids in the presence of water is a preferred method of decobalting for this process. Not only is acetal formation inhibited but some hydrolysis of acetals already present is effected. Steam or thermal decobalting wherein the aldehyde product is thermally treated with, for example, steam at 250° to 400° F. for a period of .5 to 3 hours would be satisfactory. Acid and/or thermal decobalting without added water should be avoided.

In any event the decomposition products from the decobalting operation which usually comprise cobalt, cobalt salts and other cobalt carbonyl decomposition products are removed as bottoms effluent via line 15 and the decobalted alcohol-contaminated aldehyde is recovered via line 16, preferably passed through filter 17 wherein any suspended metallic cobalt and other salts may be removed, thence via line 18 to fractionator 19. In fractionator 19 the remaining unreacted light olefins are taken overhead via line 20 and heavier products, generally referred to as oxo bottoms, via line 21. These oxo bottoms which comprise dimerized products, small amounts of acetals and other high molecular weight condensation products may, if desired, be fed to hydrogenation units for recovery of higher molecular weight alcohol.

The fractionation within tower 19 is maintained under conditions to minimize acetal formation, i. e. reduced pressures, short contact times of 5 minutes to 1 hour and low reflux as well as reboiler ratios, i. e. not greater than 5:1, are employed. After decobalting, the aldehyde product will contain some water which is taken overhead with hydrocarbon from distillation tower 19. Water as noted previously, inhibits or minimizes acetalization and if desired added water may be employed prior to or during distillation in tower 19. The fractionation in tower 19 is preferably carried out under reduced pressures, e. g. 20–100 mm. for a $C_{10}$ aldehyde.

The aldehyde product from fractionator 19 is taken via line 22 and fed to an acetalizer unit 23. This unit may comprise a drum wherein the alcohol-contaminated aldehyde product is thermally soaked, i. e. maintained at elevated temperatures, 150° to 450° F. for a period of .5 to 5 hours depending on the amount of close boiling alcohols present and the degree purity product desired. After sufficient contact or holdover time within acetalizer 23 the product containing aldehydes and high boiling acetals is removed via line 24 to fractionator 25 wherein the acetals are removed as bottoms via line 26 and the 99+% pure aldehyde via line 27. If desired for the purpose of accelerating acetalization within drum 23, up to about 5 wt. per cent of an organic acid catalyst should be employed. Typical of the acids which may be employed to catalyze the acetalization reaction are p-toluene sulfonic acid, oxo acids, oleic acid, stearic acid, other high boiling organic acids. The acid may be formed in situ by oxidizing a small amount of the aldehydes, e. g. .005–3%, preferably .01–1%. This may be accomplished by air blowing the aldehyde product. Instead of drum 23 there may be employed a reflux tower wherein the aldehyde is refluxed for .5 to 5 hours in the presence of acid. The water liberated by acetal formation is taken overhead.

In lieu of a separate acetalization in drum 23 the effluent from fractionator 19 may be fed directly into fractionator 25 wherein the alcohol-contaminated aldehyde product may be fractionated under severe conditions for sustained periods of time in the presence of an acid catalyst to effect the formation and removal of the acetals in a single step. However fractionation alone as previously indicated will not result in an aldehyde product having a purity substantially above 90–91%. If desired a diluent such as hexane, heptane and the like may be employed during acetalization. The acetals obtained via line 26 may be recycled to various points within the system such as oxo reactor 4, decobalter 14, or fed to hydrogenation units (not shown) for the recovery of alcohols. It is therefore necessary to prevent or minimize acetal formation in all units prior to the acetalizer since the formation of acetal by reaction of alcohols which may be easily separated by fractionation would result in a substantial product loss. This loss is minimized by removing the easily separated alcohols prior to the formation of acetal.

In essence, therefore, this invention is concerned only with oxo processes wherein the aldehyde product from the oxo unit contains alcohol contaminants which cannot be removed from the aldehyde by distillation. The need for this improved process is pronounced when dealing with the higher molecular weight aldehydes, e. g. $C_{9+}$, since the amount of isomers found in these high molecular weight aldehydes is considerably greater than possible in the $C_7$ and lower oxo aldehyde products. In general the boiling range of an oxo aldehyde or alcohol increases with an increase in the number of isomers present.

Example 1

To one liter of 91% $C_{10}$ aldehyde prepared by oxonating a $C_9$ olefin cut obtained from a U. O. P. polymerization process under the specific oxo conditions recited supra and which aldehyde was not further improved in purity by distillation was added 0.5 wt. percent p-toluene sulfonic acid and 200 cc. hexane. Hexane entrainer may be omitted if desired. The mixture was refluxed for one hour and the hexane distilled overhead. The $C_{10}$ aldehyde product remaining in the still was then distilled overhead at 20 mm. pressure, leaving 10% bottoms. The following overhead cuts were made:

| | Percent |
|---|---|
| 0 | 20 |
| 20 | 40 |
| 40 | 60 |
| 60 | 80 |
| 80 | 90 |

Inspections on these cuts gave 358–362 carbonyl numbers. 100% $C_{10}$ aldehyde has a carbonyl number of 360. The carbonyl number of the feed was 328, corresponding to 91.2% purity. The aldehyde product obtained in this example was 99+% pure.

Example 2

Twenty liters of $C_{10}$ aldehyde was produced by distilling $C_{10}$ oxo decobalter product in pilot plant equipment. Pressure was 50 mm., reflux ratio ¾. This aldehyde had a carbonyl number of 324, corresponding to a purity of 91%. This sample was blown with air at room temperature until the acid number attained a value of 6 (15 minutes). The acid required for acetalization was thus formed in situ. The sample was then distilled at 50 mm. pressure. The vapor temperature was 249° to 259° F. Reflux ratio was ¾. An overhead cut comprising 18 liters (90%) of the charge was take under these conditions. The carbonyl number was 360, equivalent to a purity of 100%.

Example 3

Thirty gallons of $C_8$ oxo aldehyde was removed from a distillation at 20 mm. pressure and a reflux ratio of ¾ with a vapor temperature, 140° to 150° F. This product had a carbonyl number of 415, equivalent to 94.8% purity. On redistillation, to 5 gallons of still charge was added 0.5 pound of stearic acid. A 90% yield of aldehyde was taken overhead at a vapor temperature range of 140° to 150° F. Reflux ratio was ¾. Carbonyl number of this product was 427, corresponding to a purity of 97.6%. To confirm the effect of acid, in the absence of water, of course, a second distillation was carried out identical with the first one but no acid was added. The carbonyl number was 415, corresponding to 94.8% purity, demonstrating that no improvement was made in the purity of this alcohol by conventional redistillation.

What is claimed is:

1. In a carbonylation process wherein aldehydes are produced by reacting an olefin with carbon monoxide and hydrogen in the presence of a carbonylation catalyst at elevated temperatures and pressures and wherein the aldehyde product is freed from catalyst, the improvement which comprises recovering an aldehyde product contaminated with alcohols not easily separated by distillation, fractionating said aldehyde product under mild conditions not conducive to acetal formation to remove higher and lower boiling contaminants, recovering from said fractionation step an alcohol-contaminated aldehyde mixture, subjecting said mixture to thermal treatment whereby acetalization occurs and fractionating said mixture to recover an aldehyde product of at least 99% purity.

2. A method in accordance with claim 1 wherein said thermal treatment comprises subjecting the alcohol-contaminated aldehyde mixture to elevated temperatures in the presence of an acid catalyst.

3. A method in accordance with claim 1 wherein said thermal treatment comprises thermally soaking said alcohol-contaminated aldehyde mixture at 150° to 450° F. for a period of .5 to 5 hours in the presence of a catalytic amount of an acid.

4. A method in accordance with claim 1 wherein said thermal treatment comprises refluxing said alcohol-contaminated aldehyde mixture in the presence of an acid catalyst.

5. A method in accordance with claim 1 wherein said thermal treatment comprises fractionating the alcohol-contaminated aldehyde mixture in the presence of acid catalyst.

6. A method in accordance with claim 2 wherein said acid is p-toluene sulfonic acid.

7. A method in accordance with claim 2 wherein said acid is formed in situ by oxidizing a minor proportion of the aldehydes present.

8. An improved process of preparing and purifying aldehydes which comprises reacting an olefin with carbon monoxide and hydrogen at elevated temperatures and pressures in the presence of a carbonylation catalyst in a carbonylation zone, maintaining conditions within said carbonylation zone whereby acetalization is minimized, recovering a crude aldehyde product containing alcohol contaminants which boil close to the aldehyde product, fractionating the aldehyde product to remove higher and lower boiling contaminants, said fractionation being carried out under mild conditions whereby acetalization is minimized, recovering from said fractionation an aldehyde product containing as the predominant contaminant alcohols boiling within the same range as said aldehyde, maintaining said alcohol contaminated aldehyde at elevated temperatures whereby substantially all of said alcohols will react with a minor portion of said aldehydes to form acetals, fractionating the resultant mixture and thereby separating an aldehyde product of high purity from the newly formed higher boiling acetals.

9. A method in accordance with claim 8 wherein the mild conditions include reduced pressures and short contact times.

10. In a carbonylation process wherein aldehydes are produced by reacting olefin with carbon monoxide and hydrogen in the presence of a carbonylation catalyst at elevated temperatures and pressures and wherein the aldehyde product is freed from catalyst, the improvement which comprises recovering an aldehyde product contaminated with close boiling alcohols not easily separated by distillation, fractionating said aldehyde product under mild conditions including reduced pressures and short contact times, said conditions inhibiting acetal formation to remove higher and lower boiling contaminants, recovering from said fractionation stage alcohol-contaminated aldehydes, oxidizing a small portion of said aldehydes to acids, subjecting the partially oxidized mixture to thermal treatment in the presence of said acids whereby acetalization occurs and fractionating said mixture to recover aldehydes of high purity.

11. A process of purifying a $C_{10}$ aldehyde mixture derived from the carbonylation of $C_9$ olefins, said $C_{10}$ aldehyde mixture having been treated to remove catalyst therefrom in the presence of water and under conditions whereby acetalization is minimized, said aldehyde mixture containing alcohol contaminants not easily removable by distillation, said aldehyde mixture also containing other contaminants, which comprises fractionating the aldehyde mixture under mild conditions to separate said other contaminants while suppressing acetalization, thermally treating the remaining alcohol-contaminated aldehyde mixture to promote acetalization, separating $C_{10}$ aldehydes from the high boiling acetals thus formed and recovering $C_{10}$ aldehydes of high purity.

12. A process in accordance with claim 11 wherein the alcohol-contaminated aldehyde is thermally treated in the presence of acid.

13. A method in accordance with claim 12 wherein said thermal treatment comprises thermally soaking at 150° to 450° F.

14. A method in accordance with claim 12 wherein said thermal treatment comprises refluxing the aldehyde mixture while removing water of reaction overhead.

15. A method in accordance with claim 12 wherein said acid is p-toluene sulfonic acid.

16. A method in accordance with claim 12 wherein said acid is formed in situ by oxidizing a minor portion of the aldehydes present.

17. A process of purifying a $C_8$ to $C_{21}$ aldehyde mixture derived from the carbonylation of $C_7$ to $C_{20}$ olefins, said aldehyde mixture having been treated to remove catalyst therefrom in the presence of water and under conditions whereby acetalization is minimized, said mixture containing contaminants not easily removable by distillation, said aldehyde also containing other contaminants, which comprises fractionating the aldehyde mixture under mild conditions to separate said other contaminants while suppressing acetalization, thermally treating the remaining alcohol contaminated aldehyde mixture to promote acetalization, separating and recovering aldehyde of high purity from the high boiling acetals thus formed.

References Cited in the file of this patent

UNITED STATES PATENTS

| | | |
|---|---|---|
| 2,668,862 | Price | Feb. 9, 1954 |
| 2,763,693 | Vander Woude et al. | Sept. 18, 1956 |

FOREIGN PATENTS

| | | |
|---|---|---|
| 1,018,307 | France | Oct. 15, 1952 |